(12) United States Patent
Reich et al.

(10) Patent No.: US 6,177,523 B1
(45) Date of Patent: Jan. 23, 2001

(54) FUNCTIONALIZED POLYURETHANES

(75) Inventors: Murray H. Reich, Princeton; John Teffenhart, Edison, both of NJ (US)

(73) Assignee: CardioTech International, Inc., Woburn, MA (US)

( * ) Notice: Under 35 U.S.C. 154(b), the term of this patent shall be extended for 0 days.

(21) Appl. No.: 09/353,222

(22) Filed: Jul. 14, 1999

(51) Int. Cl.[7] .................................................. C08G 18/32
(52) U.S. Cl. .......................... 525/459; 525/450; 525/453; 525/454; 525/460; 528/55; 528/56; 528/57; 528/58; 528/84; 604/27; 604/508; 604/523; 623/2.1; 623/1.1; 606/191
(58) Field of Search .................................. 525/459, 460, 525/450, 454, 453; 528/56, 57, 55, 58; 524/840, 839, 591

(56) References Cited

U.S. PATENT DOCUMENTS

| | | |
|---|---|---|
| 3,412,054 | 11/1968 | Milligan et al. |
| 4,734,462 | 3/1988 | Leidloff et al. ........................ 525/424 |
| 4,743,673 | 5/1988 | Johnston et al. ........................ 528/60 |
| 5,100,992 | 3/1992 | Cohn et al. ............................ 528/26 |
| 5,254,662 | 10/1993 | Szycher et al. ........................ 528/67 |
| 5,391,641 | 2/1995 | Hugl et al. ............................ 525/433 |
| 5,580,697 | 12/1996 | Keana et al. .......................... 430/296 |
| 5,582,995 | 12/1996 | Keana et al. .......................... 430/296 |

Primary Examiner—James J. Seidleck
Assistant Examiner—Mel. D. Bagwell
(74) Attorney, Agent, or Firm—Mathews, Collins, Shepherd & Gould P.A.

(57) ABSTRACT

The present invention relates to functionalizable and crosslinkable polyurethanes formed of a polyurethane intermediate including one or more ester groups which react with an amine equivalent to form an amide unit. The polyurethane intermediate comprises the reaction product of alkyl ester of dihydroxypolyacid or dimethylolalkanoic acid, a polyoxyalkylene diol and an organic diisocyanate. The polyurethane is reacted with a solution of an amine equivalent and a solvent or an amine. An article of manufacture can be formed from the polyurethane.

38 Claims, No Drawings

FUNCTIONALIZED POLYURETHANES

BACKGROUND OF THE INVENTION

1. Field of the Invention

The present invention relates to functionalizable and crosslinkable polyurethanes, the process of functionalizing, the process of crosslinking and the functionalized and crosslinked products derived from the functionalizable and crosslinkable polyurethanes. In particular, the present invention is concerned with crosslinked and functionalized polyether polyurethanes, the products thereof and their uses in industrial products, cosmetics and medical devices.

2. Description of Related Art

Polyurethanes that contain carboxyl groups in the backbone are known in the art. U.S. Pat. No. 4,743,673 describes the preparation of hydrophilic carboxylic acid containing polyurethanes by using diesters of dihydroxyl carboxylic acids such as the butyl ester of tartaric acid, to form polyurethane intermediates. The polyurethane intermediates are saponified and neutralized to form free carboxyl groups. This patent describes that the carboxyl groups introduce reactive sites for attaching side groups and for curing procedures. The carboxyl groups also provide sites for light or loose crosslinking curing with ammonium dichromate which can oxidize or complex with the acid group. This patent has the shortcoming that only ammonium dichromate is used and it is toxic and such products are not useful in cosmetics and medical devices.

U.S. Pat. No. 3,412,054 describes a water dilutable polymer for use as surface coatings and inks. The polyurethanes are prepared by reacting an amine or ammonia with a urethane polymer containing free carboxyl groups to form a polymer including a quaternary ammonium salt. This patent describes those polymers containing alkanoic acids that form quaternary ammonium groups in the presence of an amine but do not form the amide. Accordingly, the ammonium salt is formed and it can be functionalized but the quarternary group ionizes readily in water and is not stable.

U.S. Pat. No. 5,254,662 describes that polyurethanes prepared from the reaction of an organic diisocyanate with polycarbonate glycol can be chain extended with a diol, diamine or a mixture of diamine and alkanolamine. This patent discloses that the polyurethane formed is biostable and can be used in implantable pacemakers, vascular grafts, mammary prostheses and as other products which are intended to be placed in the body.

It is desirable to form a functionalized and crosslinked polymer using a polyether and polycarbonate polyurethane which can be used in industrial products, cosmetics and medical devices.

SUMMARY OF THE INVENTION

It has now been found unexpectedly that polyurethanes including one or more pendant ester groups can react under certain conditions with an amine equivalent to form an amide unit. The amine equivalent refers to one, two or more amine groups in a molecule. A polyurethane intermediate can be prepared from the amine-reactive pendant ester of a dihydroxypolyacid or dimethylolalkanoic acid. For example, the reaction can be performed by dissolving the polyurethane intermediate comprising the amine-reactive pendant ester group of the dihydroxypolyacid, in a substantially nonaqueous solvent containing less than about 50% water, adding a selected amount and type of amine, evaporating the solvent and heating the resultant product. This reaction is unexpected since it is known that a primary amine such as hexanediamine reacts rapidly with the carboxylic group of a dihydroxy alkanoic acid in water, but it has been found that the same amine does not react in water with the acid group of the polymer to form an amide link. It is believed that a loose cross-link forms between the amine salt of the carboxylic acid of the polymer and adjoining urethane group, preventing elimination of water and completion of the reaction to the amide. Also, steric hinderance effects may prevent reaction of amines with certain pendant acid and ester groups.

The present invention provides a polymer that can be functionalized with short and long chain hydrophobic and hydrophilic mono and polyamines and the functionalized polymer can be further reacted with compounds comprising an active hydrogen such as a fatty acid, drug, enzyme, pharmaceutically active agent (PAA), antioxidant, UV stabilizer and an unsaturated acid to crosslink the polymer by photopolymerization and free radicals and bond the polymer to polymers comprising an active hydrogen.

The ester group can be incorporated into hydrophobic, hydrophilic and amphiphilic polyether polyurethanes formed by liquid casting, prepolymer and one-shot methods. For example, suitable polymers are disclosed in U.S. Pat. Nos. 5,563,233, 4,789,720, 5,254,662, 5,118,779, 4,285,073, and as described in the section on Polyurethanes in volume II, 1969 copyright of Encyclopedia of Science and Technology, pages 506–553.

Preferably, an alkyl ester of a dimethylolalkanoic acid or dihydroxypolyacid, including 2,2-(dihydroxymethyl) propionic acid and tartaric acid, can be incorporated into a polyurethane to form a polyurethane intermediate. The polyurethane intermediate can be formed from the reaction product of an alkyl ester of a dimethylolalkanoic acid or dihydroxypolyacid, a polyoxyalkylene diol having a number average molecular weight of about 100 to about 20,000 comprising one or more of polyoxyethylene diol, polybutylene oxide, polyoxypropylene diol, polyoxytetramethylene diol, polyether polycarbonate diol and polydimethylsiloxane polyoxyalkylenecopolymer, an alkylene glycol selected from ethylene glycol, 2-methyl-1,3 propanediol, propylene glycol, dipropylene glycol, triethylene glycol, tripropylene glycol, diethylene glycol, 1,4-butane diol, neopentyl glycol, hexane diol, 2,-4-pentane diol, cyclohexanediol, cyclohexanedimethanol and 2-ethyl-1,3-hexane diol, an organic diisocyanate and a water equivalent.

A suitable substantially hydrophilic polyurethane intermediate can be formed from the reaction product of an alkyl ester of a dimethylolalkanoic acid or dihydroxypolyacid, a hydrophilic polyoxyethylene diol in an amount of at least about 60% by weight of the reaction mixture, an organic diisocyanate, with a water equivalent in an amount comprising from about 0.01% to about 0.8% by weight of the reaction mixture in an equivalent mole weight ratio of NCO to OH of the hydroxyl groups of the diol, alkylene glycol, organic diisocyanate and water of from about 0.4 to about 1.2. Alternatively, a substantially hydrophilic polymer can be formed from a reaction mixture not including alkylene glycol. By definition, all amounts of reactants are based on weight percent of the total reactants used in the reaction mixture unless otherwise specified.

A suitable substantially amphiphilic polyurethane intermediate can be formed from the reaction product of a mixture of a hydrophilic diol and a hydrophobic diol one of which incorporates an alkyl ester of a dimethylolalkanoic acid or dihydroxypolyacid. For example, the hydrophilic diol can be hydrophilic polyoxyethylene diol and the hydrophobic diol can be polyetherpolycarbonate diol comprising butane, pentane and hexane diols or polydimethylsiloxane polyoxyalkylene copolymer or mixtures thereof. A water equivalent of about 0.001% to about 0.70% by weight of the reaction mixture and an equivalent mole weight ratio of NCO to OH of the hydroxyl groups of the diol, alkylene glycol, organic diisocyanate and water of about 0.60 to about 1.2 is preferably used in the reaction mixture.

A suitable substantially hydrophobic polyurethane intermediate is formed from an alkyl ester of a dimethylolalkanoic acid or dihydroxypolyacid, at least about 5% to about 80% of a hydrophobic diol, an alkylene glycol, an organic diisocyanate, a water equivalent of about 0.001% to about 0.70%, and an NCO to OH ratio of the hydroxyl groups of the diol, alkylene glycol, diisocyanate and water of about 0.7 to about 1.2 of the reaction mixture. The polymer can be formed as a prepolymer of a diisocyanate and polyoxyalkylene diol such as polyether polycarbonate and then chain extended with an alkyl ester of a dimethylolalkanoic acid or dihydroxypolyacid.

Long chain hydrophobic and hydrophilic groups and unsaturated monomers can be grafted onto the pendant ester group of the resultant functionalized polymer, and pharmaceutically active agents (PAA) can be bonded onto the polymer and also entrapped in the resultant polymer. The resultant polymer can be used in medical devices such as sorting devices, infusion therapy catheters, vascular access and coronary grafts, sutures, introducers, oxygenators, urinary catheters, stents, introducers, organ, heart and breast implants and the like. Suitable PAAs include immunosuppressant drugs, antibacterial agents, growth factor regulators, anticoagulant, anti-thrombogenic or thrombolytic drugs.

The functionalized polymer can be bonded to polymers comprising an active hydrogen such as polymers of acrylic and methacrylic acid by reacting the acid group of the polymer with pendant amine groups of the functionalized polymer.

DETAILED DESCRIPTION OF THE INVENTION

The present invention is based on the discovery that alkyl and aromatic mono and polyamines react with certain amine-reactive alkyl ester groups of dimethylolalkanoic acid or dihydroxypolyacid that have been incorporated into a polyether polyurethane to form a polyurethane intermediate. It has been found that the ester-amine reaction can depend upon steric hinderance of the pendant ester, presence and proximity of carboxylic acid, urethane and sulfur groups on the polymer to the pendant ester group, type of alcohol, alcohol/water ratio and amount of water in the polymer and amine solvent system, method, time and temperature of the reaction. The polyurethane intermediates comprising the alkyl esters of the dihydroxypolyacid or 2,2-dimethylolalkanoic acid and amine are dissolved in substantially nonaqueous solutions of the polymers to form stable amide linkages. Preferably, the substantially nonaqueous solution comprises a percentage of water of less than about 50%, more preferably less than about 40%, still more preferably less than about 30% and most preferably less than about 20%. It has been found that an amount of about 1 to about 15% water in the solvent is desirable to dissolve hydrophilic polymers.

Alternatively, the reaction can be carried out in a solvent in absence of water under essentially oxygen-free conditions to promote the completion of the reaction of the amine to the amide. Alternatively, the polyurethane intermediate can comprise about 0.01% to about 15% of 2,2-dimethylolpropionic acid and the resultant intermediate can be reacted under certain conditions with an epoxy containing material using Lewis acid and amine type catalysts.

An amine equivalent can be used in an amount about equal to or less than an equivalent amount by weight of amine to ester in order to crosslink and chain extend the polymer, thereby increasing the molecular weight of the resultant polyurethane. The amine equivalent can be used in an amount equal to about one to about two times the equivalent amount by weight of amine equivalent to ester to form free amine groups, thereby making the amino groups available for other reactions with functional groups such as compounds containing an active hydrogen and for crosslinking the polymer. The amine equivalent can be used in an amount greater than about two to about ten times the equivalent amount by weight of amine to ester, thereby promoting functionalization of the polymer and essentially preventing crosslinking of the polymer and undue chain extension.

Examples of compounds with an active hydrogen that react with the free amine include phenol, isocyanate, carboxylic acid, mercaptan, silanol, silanoic esters and epoxy. The functionalized polymer can be reacted with the material containing the active hydrogen to enhance emulsifiability, hydrophilicity, hydrophobicity, biocompatibility, slip, crosslinking by photopolymerization, hair and skin care properties such as hold, breathability, conditioning properties, moisture and fragrance retention, protein leaching from latex gloves, strength, reduced allergic reactions and slip of rubber products.

A compound comprising an unsaturated group can be used to crosslink the polyurethane intermediate by conventional free radical and ionic catalysts techniques and photopolymerization. The compound can be difunctional or polyfunctional to crosslink the polymer, increase its molecular weight and incorporate pharmaceutically active agents (PAA), enzymes, antioxidants, long chain hydrophobic and hydrophilic groups and unsaturated monomers that can form grafted polymers, as herein more fully described. Grafted and chain extended polyurethanes can exhibit improved solvent resistance, lower expansion in aqueous solvents, improved tensile and compressive strength. Cross-linked polyurethanes provide enhanced tensile and compressive strength, improved solvent resistance, reduced expansion in solvent, enhanced elongation and lower set after elongation, elastic memory, depending upon the type and amount of crosslinking. Preferably, the degree and time of crosslinking can be controlled.

Preferably, the polyurethane intermediate can be functionalized with about two amine equivalents per equivalent of ester and then further reacted with a PAA to enhance certain desired attributes, such as to reduce clotting, bacterial and viral infection, reduce calcium formation, enhance endothilial growth, reduce plaque formation, enhance biocompatibility and strength of the coating and reduce macrophage and body enzyme attack, with an enzyme to enhance biocompatiblity, hydrophilicity, hydrophobicity, emulsifiability and other biochemical properties, and with an antioxidant and ultraviolet stabilizer to protect against oxygen and sunlight.

The polyurethane intermediate comprising one or more pendant ester groups can be reacted with a monoamine such as a fatty amine and polyoxyalkylene amine to enhance adhesion, hydrophobicity, hydrophilicity, hair and skin care properties and emulsifiability.

The polyurethane intermediate comprising the pendant ester group can be bonded to another polymer comprising an amine-reactive pendant ester group and also to a substrate polymer with a pendant or terminal amine group, such as polymers prepared with vinyl amines. Bonding of the polyurethane intermediate to a nonpendant ester comprising substrate can be enhanced by crosslinking with a diamine so that the polyurethane comprising a reactive pendant ester does not leach from the substrate, but is intimately intertwined with the substrate, forming an interpenetrating network (IPN.)

The polyurethane intermediate is normally a solid at ambient temperature and can be dissolved in a suitable solvent such as glycerin, glycol, a substantially non-aqueous solution of water and ethanol, ketone, dimethylacetamide, dimethylformamide, acetone, tetrahydrofuran, and mixtures thereof The solution can be cast, sprayed or painted onto a substrate, and the substrate can be dipped into a solution of the amine and the polyurethane intermediate.

Alternatively, the amine-ester reaction of polyurethane comprising the alkyl ester of 2,2-dimethylolalkanoic acid can be catalyzed under certain conditions with, for example, Lewis acids, tertiary amines, unblocked and amine-blocked alkane and aromatic sulfonic acid catalysts to form stable amide links. A polyurethane comprising 2,2-dimethylolpropionic acid can be functionalized and crosslinked with an epoxy containing materials under certain conditions in the presence of catalysts such as, for example, Lewis acids, tetrabutyl titanate, unblocked and amine-blocked alkane and aromatic sulfonic acid catalysts, amines selected from benzyldimethyl amine, benzyldimethyl ammonium chloride, dimethylcyclohexylamine, triethylenediamine, triphenylphosphine and other conventional epoxy curing agents.

Preferably, the polymers that are modified with one or more pendant ester groups are generally defined as amphiphilic because the polymers comprise hydrophobic properties and hydrophilic properties, although some polymers are substantially more hydrophobic and others substantially more hydrophilic. The hydrophobic properties can be present in polymers formed from hydrophobic urethane, hydrophobic polyoxyalkylene diols and urea groups. The polymer can comprise hydrophilic polyoxyethylene diols of different molecular weights to provide hydrophilic properties. The polymer compositions are more particularly defined as either substantially hydrophobic, substantially amphiphilic or substantially hydrophilic. For the purpose of this invention, polymers having water absorptivities greater than about 80% are defined as substantially hydrophilic. Polymers having water absorptivities of about 25% to about 80% are defined as substantially amphiphilic. Polymers having water absorptivities of about 0.001% to less than about 25% are defined as substantially hydrophobic. Water absorptivity is defined as the percentage weight of water in a polymer film that has been immersed in water for 24 hours. The remainder is the percentage weight of polymer.

Suitable polyether polyurethane polymers for use in the present invention are described in U.S. Pat. Nos. 4,131,604, 4,256,066, 4,156,067, 4,255,550, 4,359,588, 4,408,023, 4,242,305, 4,490,432, 4,496,535, 4,523,005, 4,729,914, 4,743,673, 4,780,512, 4,789,720, 4,798,876, 4,810,582, 5,000,955, 5,120,816, 5,334,691, 5,273,742, 5,563,233, 5,728,762, 5,254,662, 5,118,779, and 4,285,073, as well as those prepared by the prepolymer method known by those skilled in the art and described in the Polyurethane section of Volume II of the Encyclopedia of Science and Technology, pages 506–553. Suitable substantially hydrophobic polymers as described in U.S. Pat. Nos. 4,789,720, 5,254,662, 5,118,779, and 4,285,073, as well as those prepared by the prepolymer, one shot, and liquid casting methods known by those skilled in the art and described in the Polyurethane section of Volume II of the Encyclopedia of Science and Technology, pages 506–553. Suitable substantially amphiphilic polymers are described in U.S. Pat. No. 4,789,720. Suitable substantially hydrophilic polymers are described in U.S. Pat. Nos. 5,563,233 and 5,728,762. U.S. Pat. Nos. 4,131,604, 4,523,005, 4,789,720, 5,563,233, 5,254,662 and 5,728,762 are hereby incorporated by reference into this application.

The polyether polyurethane intermediate has advantageous chemical, biomedical, cosmetic, and industrial properties which derive from the structure of the polymers. The polyether polyurethane intermediate can be prepared by reacting aromatic and aliphatic diisocyanates with a polyoxyalkylene diol, alkyl ester of dimethylolalkanoic acid or dihydroxypolyacid and an alkylene glycol. The polyether polyurethane intermediate can be the reaction product of a polyoxyalkylene diol having a number average molecular weight of about 100 to about 20,000 comprising one or more of polyoxyethylene diol, polybutylene oxide, polyoxypropylene diol, polyoxytetramethylene diol, polyetherpolycarbonate diol and polydimethylsiloxane polyoxyalkylenecopolymer, about 0.01% to about 30% by weight of the reaction mixture of an alkyl ester of a dimethylolalkanoic acid or dihydroxypolyacid selected from dihydroxy benzoic acid ester, glyceric acid ester, hydroxy dicarboxylic acid ester such as straight chain and branched alkyl esters of tartaric acid and trihydroxy n-butyric acid containing carbon lengths of 1-20, and straight chain and branched alkyl esters of 2,2-di(hydroxymethyl)propionic acid containing carbon lengths of 1–20, an alkylene glycol selected from ethylene glycol, 2,-4-pentane diol, 2-methyl-1,3 propanediol, propylene glycol, 1-4-butane diol, neopentyl glycol, dipropylene glycol, triethylene glycol, tripropylene glycol, diethylene glycol, hexane diol, 2,-4-pentane diol, cyclohexanediol, cyclohexanedimethanol, 2,2-dimethylolpropionic acidand 2-ethyl-1,3-hexane, an organic diisocyanate and a water equivalent in an equivalent mole weight ratio of NCO/OH of the diols, alkylene glycol and water of about 0.4 to about 1.2. Preferably, the water equivalent is present in an amount by weight of the reaction mixture comprising from about 0.001% to about 0.80% for forming substantially hydrophobic, amphiphilic and hydrophilic polymers. Preferably at least about 5% by weight of the reaction mixture of polyoxyethylene diol is used in the reaction mixture to produce substantially amphiphilic and substantially hydrophilic polymers. Alternatively, a polyether polyurethane intermediate suitable for use in the present invention can be formed of a polyoxyalkylene diol, an alkyl ester of dimethylolalkanoic acid or dihydroxypolyacid, a diisocyanate and a water equivalent without the use of alkylene glycol in the reaction mixture. Alternatively, a polyether polyurethane intermediate suitable for use in the present invention can be formed of a polyoxyalkylene diol, 2,2-dimethylolalkanoic acid, or an alkyl ester of dimethylolalkanoic acid or dihydroxypolyacid, a diisocyanate and a water equivalent without the use of alkylene glycol in the reaction mixture.

The diisocyanate can be selected from the group consisting of tetramethylene duisocyanate, hexamethylene disocyanate, trimethylene diisocyanate, trimethylhexamethylene diisocyanate, tetramethylxylylene diisocyanate, 4,4-dicyclohexylmethane diisocyanate, dimer acid diisocyanate, isophorone diisocyanate, metaxylene diisocyanate, decamethylene 1,10-diisocyanate, cyclohexylene 1,2-diisocyanate, cyclohexylene, 1,4-diisocyanate, hexahydrotoluene diisocyanate, toluene diisocyanate (and isomers) and mixtures thereof.

Preferably the amount of the alkyl ester of the dimethylolalkanoic acid or dihydroxypolyacid can be from about 0.02% to about 20%, more preferably from about 0.03% to about 15%, still more preferably from about 0.05% to about 10% and most preferably from about 0.10% to about 8% by weight of the reaction mixture. Preferably, the acid ester employed in the present invention is a methyl, ethyl, propyl or butyl ester of tartaric acid and propyl, ethyl, methyl or butyl ester of 2,2-di(hydroxymethyl)alkanoic acid, and more preferably a propyl, ethyl, methyl or butyl ester of dimethylolpropionic acid and methyl ester of tartaric acid.

Alternatively a prepolymer with terminal isocyanate groups can be made in accordance with conventional methods for producing polyether polyurethanes and then chain extended with the alkyl ester of a dimethylolalkanoic acid or dihydroxypolyacid. The polyether and polycarbonate polyurethane can be prepared by reacting about 2.01 to about 2.7 equivalents of an organic diisocyanate with a polyoxyalkylene diol having a number average molecular weight of about 100 to about 20,000 and selected from one or more of polyoxypropylene diol having a number average molecular weight of about 200 to about 4,000, polydimethylsiloxane polyoxyalkylene copolymer having a number average molecular weight of about 400 to about 3,000, polyoxytetramethylene diol having a number average molecular weight of about 400 to about 3,000, polybutylene oxide having a number average molecular weight of about 1,000 to about 4,000 and polyether polycarbonate diol having an average molecular number weight of about 400 to about 4,000 at about 60° C. to about 130° C. for about one hour to about twenty hours and then reacted with an alkylene glycol including an alkyl ester of a dimethylolalkanoic acid or dihydroxypolyacid selected from dihydroxy benzoic acid esters, glyceric acid esters, straight chain and branched alkyl esters of tartaric acid and trihydroxy n-butyric acid containing carbon lengths of 1–20 and straight chain and branched alkyl esters of dihydroxy(alkanoic acids) containing carbon lengths of 1–20. The prepolymer and the alkylene glycol are reacted for about one to about twenty hours at about 60° C. to about 150° C.

Alternatively an alkylene glycol can be added with the alkyl ester of the dimethylolalkonic acid or dihydroxypolyacid for forming a prepolymer selected from the group of ethylene glycol, 2,-4-pentane diol, 2-methyl-1,3 propanediol, propylene glycol, dipropylene glycol, 1,4-butane diol, neopentyl glycol, triethylene glycol, tripropylerie glycol, diethylene glycol, hexane diol, cyclohexanediol, cyclohexanedimethanol, 2,2-dimethylolpropionic acid and 2-ethyl-1,3-hexane diol, and mixtures thereof. The prepolymer is reacted with the polyoxyalkylene diol organic diisocyanate reaction product for forming the polyurethane intermediate as described above.

The above-described polymers can contain terminal hydroxyl groups and can be formed to different molecular weights and degrees of hydrophilicity and hydrophobicity by adjusting the amount of water, the NCO to OH ratio, the amount and type of the alkyl ester of the dimethylolalkanoic acid or dihydroxypolyacid, and the amount, molecular weight and ratio of hydrophilic to hydrophobic polyoxyalkylene diol in the reaction mixture. The polyurethane intermediate will normally have a weight average molecular weight range of about 10,000 to about 500,000 and the chain extended polyurethane can have a weight average molecular weight of about 20,000 to more than about 1,000,000.

A substantially hydrophilic polyether polyurethane intermediate can be formed of the reaction product of a diol component comprising at least about 40% of a polyoxyethylene diol having a number average molecular weight of about 200 to about 20,000, a minority of a hydrophobic polyoxyalkylene diol selected from, polyoxypropylene diol having a number average molecular weight of about 200 to about 6,000, polydimethylsiloxane polyoxyalkylene copolymer having a number average molecular weight of about 400 to about 4,000, polyoxytetramethylene diol having a number average molecular weight of about 400 to about 3,000, polybutylene oxide having a number average molecular weight of about 1,000 to about 2,000 and polyether polycarbonate diol having an average molecular number weight of about 400 to about 4,000, about 0.01% to about 30% of an alkyl ester of a dimethylolalkanoic acid or dihydroxypolyacid selected from dihydroxy benzoic acid esters, glyceric acid esters, straight chain and branched alkyl esters of tartaric acid and trihydroxy n-butyric acid containing carbon lengths of 1–20 and straight chain and branched alkyl esters of di(hydroxymethyl)alkanoic acids containing carbon lengths of 1–20, preferably dihydroxy(methylolpropionic) acid, about 0.01% to about 10% of a low molecular weight alkylene glycol selected from the group of ethylene glycol, 2,-4-pentane diol, 2-methyl-1,3 propanediol, propylene glycol, dipropylene glycol, 1,4-butane diol, neopentyl glycol, triethylene glycol, tripropylene glycol, diethylene glycol, hexane diol, cyclohexanediol, cyclohexanedimethanol, 2,2-dimethylolpropionic acid and 2-ethyl-1,3-hexane diol, and mixtures thereof having a number average molecular weight of about 1,000 to about 9,000, about 2.0% to about 70% of an organic diisocyanate and water in an amount comprising from about 0.001% to about 0.8% of the reaction mixture in a mole weight ratio of NCO/OH of from about 0.4 to about 1.2. Alternatively, a substantially hydrophilic polyether polyurethane suitable for use in the present invention can be formed of a polyoxyalkylene diol described above, an alkyl ester of a dimethylolalkanoic acid or dihydroxypolyacid, a diisocyanate and a water equivalent without the use of alkylene glycol in the reaction mixture. The reaction mixture can also include a dimethylolalkanoic acid. The incorporation of ester and acid moieties in the polymer can enhance hydrophilicity and water solubility of the nonfunctionalized polyurethane.

Preferably, the alkylene glycol used in the reaction mixture for forming a substantially amphiphilic polyurethane intermediate is ethylene glycol or diethylene glycol. Preferably the amount of water in the reaction mixture is from about 0.01% to about 0.7%, and most preferably from about 0.02% to about 0.45%. Preferably the equivalent weight ratio of NCO to OH used in the reaction mixture is from about 0.70 to about 1.2 more preferably from about 0.80 to about 0.99. The polyurethane intermediate comprising the ester of a dimethylolalkanoic acid or dihydroxypolyacid can be chain extended and cross-linked with a diamine so that it insoluble in water and in other solvents.

A substantially hydrophilic polyurethane intermediate can be formed from at least about 60% of a hydrophilic polyoxyethylene diol having a number average molecular weight of about 200 to about 20,000, preferably 1,000 to about 15,000, more preferably from about 2,000 to about 12,000, still more preferably from about 3,000 to about 12,000 and most preferably from about 4,000 to about 10,000. Substantially hydrophilic polymers can also comprise less than about 15% of hydrophobic diols.

A substantially hydrophilic polyether polyurethane can be formed with an alkyl ester of dimethylolalkanoic acid or dihydroxypolyacid which comprises about 0.05% to about 20% of ester acid by weight of the reaction mixture, more preferably about 0.1% to about 15%, still more preferably from about 0.2% to about 10% and most preferably from about 0.3% to about 5%. Preferably, the ester acid is an ethyl, methl propyl and butyl ester of dimethylolpropionic acid and a methyl, ethyl, propyl and butyl ester of tartaric acid, and most preferably the methyl, ethyl, and propyl esters of tartaric acid and dimethylolpropionic acid. Alternatively, a high slip, high water absorptive functionalizable and crosslinkable polymer can be made using about 0.01% to about 6% of 2,2-dimethylolpropionic acid, preferably about 0.1% to about 3% in combination with an alkyl ester of tartaric acid or 2,2-dimethylolpropionic acid.

The amount of diisocyanate in the reaction mixture for forming a substantially hydrophilic polyurethane intermediate can vary from about 2% to about 70% and preferably from about 3% to about 40%, and more preferably from about 3% to about 25%. The polymers are prepared by reacting an ester acid, alkylene glycol and polyoxyalkylene diol with an aliphatic or aromatic diisocyanate. Preferably, the isocyanate is tetramethylxylylene diisocyanate, methylene bis(-cyclohexyl-4-isocyanate) and methylene bis(-phenyl-4-isocyanate).

Alternatively, about 0.10% to about 15.0% preferably from about 0.20% to about 10%, and most preferably from about 0.4% to about 8.0% of polyetherpolycarbonate diols comprising butane, pentane, hexane and octane diols, polybutylene oxide, polyoxytetramethylene diols, polydimethylsiloxane polyoxyethylene copolymers, and polyoxypropylene diols having a number average molecular weight of about 250 to about 2,400 can be used in the reaction mixture for forming a substantially hydrophilic diol.

The substantially hydrophilic polymers have viscosities at about 3% concentration in a 60/40 propylene glycol/water solution of about 1 cps to insolubility. The concentration of the polymer capable of forming a solution can vary depending upon the weight average molecular weight of the polymer and the viscosity of the polymer in aqueous media depends upon polymer variables such as the amount of urea groups and type of diol used in forming the polymer. After reacting the substantially hydrophilic polyurethane intermediate with about 0.2 to about 1.9 equivalent amine per ester group, the polymer can become insoluble in an aqueous and organic solvent. Preferably the amount of water in the reaction mixture is from about 0.02% to about 0.25% and the NCO to OH ratio is from about 0.85 to about 0.99.

Suitable substantially amphiphilic polyether polyurethane intermediates are formed from the reaction product an alkylene glycol, an alkyl ester of dimethylol alkanoic acid or dihydroxypolyacid and a mixture of hydrophilic and hydrophobic polyoxyalkylene diols. Suitable substantially amphiphilic polymers comprise, at least about 0.5% of an alkylene glycol, at least about 15% hydrophilic polyoxyalkylene diol and at least about 10% hydrophobic polyoxyalkylene diol, each of the polyoxyalkylene diols having a number average molecular weight of at least about 200 or higher.

Preferably the substantially amphiphilic polyurethanes is formed from the reaction mixture of about 0.1% to about 20% of an alkyl ester of dimethylolalkanoic acid or dihydroxypolyacid, a hydrophilic diol of polyoxyethylene diol having a number average molecular weight from about 400 to about 10,000 at about 10% to about 95% by weight of the reaction mixture mixed with a portion of hydrophobic polyoxyalkylene diol of about 15% to about 30% by weight of the reaction mixture. The hydrophobic polyoxyalkylene diol is preferably at least one hydrophobic polyoxyalkylene diol selected from polyoxytetramethylene diol having a number average molecular weight of from about 200 to about 4,000, polyoxypropylene diol having a number average molecular weight of from about 400 to about 4,000, polyether polycarbonate diol having a nuriber average molecular weight of about 1,000 to about 2,000, polybutylene oxide having a number average molecular weight of about 1000 to about 4000, and polydimethylsiloxane polyoxyalkylene copolymer having a number average molecular weight of about 500 to about 3,000 wherein the polyoxyalkylene is selected from polyoxyethylene and polyoxypropylene. Preferably, the hydrophobic polyoxyalkylene diol comprises about 10% to about 25% of polyoxytetramethylene diol having a number average molecular weight of about 200 to about 4,000 and about 1.0% to about 25% polyoxypropylene diol having a number average molecular weight from about 400 to about 4,000, thereby providing a hydrophobic diol component with a number average molecular weight of about 200 to about 3,000. The diol component is mixed with about 0.01% to about 30% of an alkyl ester of dimethylolalkanoic acid or dihydroxypolyacid selected from dihydroxy benzoic acid esters, glyceric acid esters, and straight chain and branched alkyl esters of tartaric acid and trihydroxy n-butyric acid containing carbon lengths of 1–20 or butyl, propyl, ethyl, methyl, pentyl, hexyl, octyl, decyl, nonyl ester of dihydroxy(methylpropionic acid) and about 0.1% to about 30% of an alkylene glycol selected from ethylene glycol, propylene glycol, 2-ethyl-1,3-hexane diol, tripropylene glycol, 1,4-butane diol, neopentyl glycol, triethylene glycol, 2,-4-pentane diol, 2-methyl-1,3 propanediol, hexane diol, cyclohexanediol, cyclohexanedimethanol, dipropylene glycol, 2,2-dimethylolpropionic acid and diethylene glycol, an organic diisocyanate and water in an equivalent in an amount comprising from about 0.05% to about 0.70% of the reaction mixture in an equivalent mole weight ratio of NCO to OH of the diol, alkylene glycol and water of from about 0.60 to about 1.2. The ratio of NCO to OH groups for the substantially amphiphilic polyurethane intermediate is preferably in the range of about 0.90 to about 1.0. The sum of all ingredients including the diols, glycols, water and diisocyanate in the reaction mixture totals 100 parts by weight.

Alternatively, a substantially amphiphilic polyurethane intermediate can be formed of an ester of dimethylolalkanoic acid or dihydroxypolyacid and a hydrophilic diol of polyoxyethylene diol of about 10% to about 50% by weight of the reaction mixture having a number average molecular weight of about 800 to about 20,000, a hydrophobic polyoxyalkylene diol of about 1% to about 30% by weight of the reaction mixture having a number average molecular weight of from about 200 to about 4,000 selected from polyoxypropylene and polyoxytetramethylene diols and mixtures thereof to provide a number average molecular weight for the diol component of about 2,000 to about 6,500, about 1% to about 30% of an alkylene glycol selected from ethylene glycol, propylene glycol, 2-ethyl-1,3-hexane diol, 1,4-butane diol, neopentyl glycol, tripropylene glycol, triethylene glycol, 2,-4-pentane diol, 2-methyl-1,3 propanediol, hexane diol, cyclohexanediol, cyclohexanedimethanol, dipropylene glycol, 2,2-dimethylolpropionic acid and diethylene glycol, an organic diisocyanate and a water equivalent in an amount comprising from about 0.20% to about 0.80% by weight of the reaction mixture in an equivalent mole ratio of NCO to OH of from about 0.70 to about 1.1.

Alternatively about 1% to about 30% of polyetherpolycarbonate diol (PCD) of about 400 to about 3,000 number average molecular weight, polydimethylsiloxane polyoxyethylene copolymer of about 400 to about 3,000 number average molecular weight, and polybutylene oxide having a number average molecular weight of about 1,000 to about 4,000 can be used as a hydrophobic diol in the polyurethane intermediate. The polyether groups in PCD are preferably butane diol and hexane diol.

Alternatively, the substantially amphiphilic polyether polyurethane intermediate can be formed of about 0.2% to about 15% of an alkyl ester of a dimethylolalkanoic acid or dihydroxypolyacid, about 20% to about 60% of a polyoxyethylene diol having a number average molecular weight of about 800 to about 3,400, about 5% to about 30% of an alkylene glycol selected from ethylene glycol, propylene glycol, 2-ethyl-1,3-hexane diol, tripropylene glycol, triethylene glycol, 2,-4-pentane diol, 2-methyl-1,3 propanediol, hexane diol, 1,4-butane diol, neopentyl glycol, cyclohexanediol, cyclohexanedimethanol, dipropylene glycol, 2,2-dimethylolpropionic acid and diethylene glycol, an organic diisocyanate and a water equivalent in an amount comprising from about 0.10% to about 0. 50% by weight of the reaction mixture in an equivalent mole ratio of NCO to OH of from about 0.80 to about 1.1. Preferably the alkylene glycol is ethylene glycol, 1,4-butane diol and diethylene glycol. Preferably the substantially amphiphilic polyurethane intermediate is reacted with about 0.2 to about 2.0 or more equivalents of an amine in 95/5 ethanol to water solution to form crosslinked and functionalized polymers.

A suitable substantially hydrophobic polyurethane intermediate can be formed of about 5% to about 80% of a hydrophobic polyoxyalkylene diol and preferably about 25% to about 70%. Substantially hydrophobic polymers can also comprise from about 0.1% to about 40% of a hydrophilic diol, preferably less than about 25% hydrophilic diol and most preferably less than about 15%. Preferably, a substantially hydrophobic polyether polyurethane intermediate of the present invention can be formed of the reaction product of about 5% to about 70% of a hydrophobic polyoxyalkylene diol selected from a polyoxypropylene diol and polyoxytetramethylene diol having a number average molecular weight from about 200 to about 6,000, polybutylene oxide having a number average molecular weight of about 1,000 to about 4,000, polydimethylsiloxane polyoxyethylenecopolymer (PDMS) having a number average molecular weight of about 500 to about 3000, polyetherpolycarbonate diol (PCD) comprising a hexane, butane and pentane diol and having a number average molecular weight of about 1,000 to about 4,000. About 1% to about 40% of a hydrophilic diol of a polyoxyethylene diol having a number average molecular weight of from about 400 to about 20,000, about 0.01% to about 30% of an alkyl ester of a dimethylolalkanoic acid or dihydroxypolyacid selected from dihydroxy benzoic acid esters, glyceric acid esters, straight chair and branched alkyl esters of tartaric acid and trihydroxy n-butyric acid containing carbon lengths of 1–20 as butyl, propyl, ethyl, pentyl, hexyl, methyl, octyl, decyl, nonyl ester of 2,2-dimethylolpropionic acid, an alkylene glycol selected from ethylene glycol, propylene glycol, 2-ethyl-1,3-hexane diol, 1,4-butane diol, neopentyl glycol, tripropylene glycol, triethylene glycol, 2,-4-pentane diol, 2-methyl-1,3 propanediol, hexane diol, cyclohexanediol, cyclohexanedimethanol, dipropylene glycol and diethylene glycol, 2,2-dimethylolpropionic acid and mixtures thereof, an organic diisocyanate and a water equivalent in an amount comprising from about 0.01% to about 0.70% by weight of the reaction mixture in an equivalent mole weight ratio of NCO to OH of the hydroxyl groups of the diols, alkylene glycol and water in the reaction mixture from about 0.7 to about 1.2.

Preferably, the number average molecular weight of the polyoxyalkylene diol component is from about 500 to about 4,000. Preferably the hydrophobic polyoxyalkylene diol is a polyetherpolycarbonate diol (PCD) comprising a hexane, butane and pentane diol and having a number average molecular weight of about 1,000 to about 4,000 or polydimethylsiloxane polyoxyethylenecopolymer having a number average molecular weight of about 500 to about 3,000, or a mixture thereof. The amount of the PCD in the reaction mixture is from 5% to about 70%, preferably from about 15% to about 60%. The amount of the PDMS in the reaction mixture is from about 5% to about 50%, more preferably from about 10% to about 40%. Preferably the hydrophobic polyether polyurethane comprises PCD and PDMS as the hydrophobic polyoxyalkylene diols.

Alternatively, the hydrophobic polyoxyalkyene diol is a polyoxypropylene diol having from about 1,000 to about 4,000 number average molecular weight. The amount of polyoxypropylene diol in the reaction mixture for forming the substantially hydrophobic polyurethane intermediate is from about 10% to about 60% most preferably from about 15% to about 50%.

The number average molecular weight of the polyoxyethylene diol used in the reaction mixture for forming a substantially hydrophobic polyurethane intermediate is from about 200 to about 10,000. Preferably, a polyoxyethylene diol having a number average molecular weight of about 1,000 to about 2,000 is used in the reaction mixture in an amount of about 1% to about 30%, preferably from about 2% to about 25%, still more preferably from about 3% to about 20%, and most preferably from about 4% to about 15%. Alternatively, about 4% to about 15% of polyoxyethylene diol having a number average molecular weight from about 3,000 to about 10,000 can be used in the reaction mixture. Preferably, the NCO to OH ratio is from about 0.80 to about 1.0, more preferably from about 0.90 to about 0.99. The sum of all ingredients including the diols, glycols, water and diisocyanate in the reaction mixture totals 100 parts by weight.

The amount of diisocyanate in the reaction mixture can vary from about 10% to about 70% and preferably from about 20% to about 60%. The polymers are prepared by reacting the polyoxyalkylene diols with the diisocyanate. Still more preferably, isocyanates are tetramethylxylylene diisocyanate, methylene bis(-cyclohexyl-4-isocyanate) and methylene bis(-phenyl-4-isocyanate), and most preferably methylene bis(-cyclohexyl-4-isocyanate).

In an alternate embodiment polyoxytetramethylene diol having a number average molecular weight from about 1,000 to about 2,000 can be used as the hydrophobic diol in the reaction mixture in an amount of about 5% to about 25%. Alternatively a hydrophobic diol having a number average molecular weight from about 1,000 to about 6,000, selected from polyetherpolycarbonate diol comprising hexane, propane, pentane and butane diol, polydimethylsiloxane polyoxyalkylene copolymer having a number average molecular weight from about 500 to about 3,800, preferably from about 600 to about 3,000 polydimethylsiloxane polyoxyethylene copolymer and polybutylene oxide, and mixtures thereof can be used in the reaction mixture.

Preferably the number average molecular weight of the substantially hydrophobic polyoxyalkylene diol is from about 700 to about 5,000, more preferably about 700 to about 4,000 and most preferably from about 800 to about 3,000. Preferably the amount of the hydrophobic polyoxyalkylene diol in the reaction mixture for forming the substantially hydrophobic polyether polyurethane is from about 20% to about 60%, more preferably from about 30% to about 50%.

Preferably the amount of the alkylene glycol used in the reaction mixture for forming the hydrophobic polyoxyalkylene polyurethane intermediate is in the amount of about 1.0% to about 40%, preferably from about 1.5% to about 30%, more preferably from about 2% to about 25%, and most preferably from about 2.5% to about 20%. Preferably the alkylene glycol is triethylene glycol, 1,4-butane diol, neopentyl glycol, diethylene glycol, 2,2-dimethylolpropionic acid and ethylene glycol, and more preferably the alkylene glycol is ethylene glycol, and the amount of the ethylene glycol in the reaction mixture is from about 2% to about 15%.

Representative amines which can be used in the reaction mixture of the polyurethane intermediate for forming the resultant polymer are an alkyl or aromatic mono and polyamine such as alkyl, aromatic and polyamines. Preferably, alkyl amines can contain carbon lengths of 1 to 20, and polyoxyalkylene amines and diamines and polyamines, for example made under the trademark of Jeffamine by Huntsman Corporation can have a number average molecular weight from about 100 to about 8000. The amines can be selected from the group of ethylene diamine, propanediamine, butanediamine, pentane diamine, propyl amine, pentylamine, ethylene amine, heptyl amine, butyl amine, triethylene tetraamine, diethylenetriamine, hexylamine, heptanediamine, octanediamine, m-xylylene diamine, 1,4-diaminocyclohexane, 2-methylpentamethylene diamine, hexanediamine, nonanediamine, dodecyldiamine, diaminotoluene, phenylenediamine, benzidazole, benzothiazoles, aniline, xylylenediamine, benzene diamines, Jeffamine amine D and E series, diglycolamine, and ethanolamine, and mixtures thereof Preferably, for polyurethanes comprising the alkyl ester of 2,2-dimethylolalkanoic acid, alkyl amines and diamines having carbon chain lengths of 1–20 are used to react with the pendant ester group, more preferably chain lengths of about 1–10 and most preferably chain lengths about 1–6 are used in the reaction mixture. Preferably about 0.2 to about 2.2 equivalent of amine per ester can be used in the reaction mixture. More preferably about 0.3 to about 1.0 equivalent of diamine per reactive pendant ester are used in the reaction mixture to crosslink the polymer and about 1.8 to about 2.2 or more equivalents of amine per ester are used to functionalize the polymer with an amine group. An excess of polyamine of about 2.3 to about 15, preferably about 2.3 to about 10, more preferably about 2.3 to about 7 equivalents of amine per ester can be used to functionalize the polymer, minimize crosslinking and control chain extension. Certain monoamines such as vinyl amine can be used at a ratio of about 0.2 to 1.2 equivalents to functionalize the polyurethane intermediate. The resultant polymer can be formed into an article of manufacture including a film, coating, molding, extruded product, and cast into a film.

The reaction of the polyurethane intermediate comprising the alkyl ester of dihydroxypolyacid with an amine can be carried out at about 25° C. to about 150° C. in about 1 minute to about 72 hours, depending upon the type of amine and ester, preferably under essentially oxygen-free conditions.

Preferably, the reaction of the polyurethane intermediate comprising the alkyl ester of 2,2-dimethylolalkanoic acid with an amine is carried out in the presence of catalysts selected from p-toluene sulfonic acid, phosphoric acid, acetic anhydride, acetic acid chloride and phosphorus pentoxide, Lewis acids, tetrabutyl titanate, zinc chloride, antimony triflouoride, zinc octoate, stannous octoate, dibutyltin dilaurate, potassium octoate, bismuth neodecanate, sulfuric acid, and amine blocked and unblocked alkane sulfonic and aromatic sulfonic acids such as methane and p-toluene sulfonic acid and the like. Other catalysts can include stannic chloride, sodium thiosulfate and zinc carbonate. The amine-blocked and unblocked acid catalysts can be selected from fully neutralized 2-amino-2methyl-1-propanol salt of dodecylbenzenesulfonic acid (50% active) in isopropanol and fully neutralized 2-amino-2-methyl-1-propanol salt of p-toluene sulfonic acid monohydrate (pTSA) (50% active) in isopropanol, alkanesulfonic acids blocked with proprietary amines manufactured under the trade names of M-Cat 1202, 1201, 1219, 1220, 1221, 1222, 1223, and 1228 made by Elf Atochem, proprietary amine blocked p-toluene sulfonic acid in mixture of solvents (64% active) made by Byk-Chemie under the tradename of Byk-460, proprietary amine blocked dodecylbenzenesulfonic acid (35% active) in methanol made by King Industries under the tradename of Nacure 5543. Preferred catalysts are Lewis acid catalysts, amine blocked and unblocked pTSA and methane sulfonic acid. The polymer can be added to the solution of amine in essentially nonaqueous solvent such as ethanol, methyl ethyl ketone, pyrrolidone, dimethylacetamide, dimethylformamide, isopropanol, methanol and butanol. Alternatively, the reaction of the polyurethane intermediate comprising 2,2-dimethylolalkanoic acid can be carried out with epoxy containing materials selected from epoxy bisphenol-epichorohydrin resins, cycloaliphatic type epoxy resins, epoxidized fatty acids, glycidyl methacryalate, glycidyl acrylate, and the like using the aforementioned catalysts, Lewis acids and amines selected from diethylenetriamine, triethylenetetramine, benzyldimethylamine, benzyldimethyl ammonium chloride, dimethylcyclohexyl amine, triphenylphosphine and other typical epoxy curing agents.

Alternatively, cycloaliphatic epoxides can be reacted with the hydroxyl groups of polyurethane intermediates comprising dimethylolalkanoic acid and the alkyl esters of dihydroxypolyacid by a cationicky UV-cured mechanism using UV-photoinitiators.

The reaction between the specific ester and specific amine can depend upon the amount of water in the solvent system. For example, the reaction between hexane diamine and the pendant ester group of polymer comprising the alkyl ester of tartaric acid or 2,2-dimethylolpropionic acid occurs in solvent preferably with less than about 50% of water, more preferably less than about 40%, still more preferably less than about 30% and most preferably with less than about 20%, since water increases the formation of the acid group which is not readily amenable to reaction with the amine The color of some reaction products can be related to the specific ester and amine, and methods of polymerization and reaction. For example, the yellow color obtained with functionalized polyurethanes comprising butyl tartrate is attributed to the presence of the amide and hydroxyl group on the same carbon atom and to the oxidation of the tartrate group. The yellow color of the polymer can be significantly reduced by reacting polyurethane intermediates comprising the alkyl ester of dihydroxypolyacids with an amine under substantially oxygen-free conditions and by using polyurethane intermediates comprising the alkyl esters of dimethylolpropionic acid such as butyl, ethyl, methyl and propyl and by using de-colorizing agents and decreasing the level of impurities in the amines. Alternatively, the functionalization and crosslinking reactions can be carried out in a solvent for dissolving the polyurethane intermediate. The resultant polymer can be formed into an article of manufacture including a film, coating, molding, extruded product, and cast into a film. The resultant polyurethane is adapted for use in medical device applications such as accessories, components, infusion therapy catheters, midline catheters, intravenous catheters, softenable, nonswellable catheters, synthetic heart valves, veins, and arteries, scar flatteners, cardiovascular therapy catheters, stents, ports, dilators, and dialysis catheters and the like, and for shaving products.

In an alternate embodiment of the present invention the reaction mixture for forming a hydrophobic polyurethane, such as described in U.S. Pat. No. 4,789,720 and in Example One of U.S. Pat. No. 5,254, 662 can be modified to include an alkyl ester of a dimethylolalkanoic or dihydroxypolyacid. For example, the hydrophobic diol can be formed from a reaction mixture tetramethylxylene diisocyanate, metaxylene diisocyanate, aliphatic or aliphatic-alicyclic organic diisocyanate, polycarbonate glycol, an aliphatic diol, and an alkyl ester of a dimethylolalkanoic acid or dihydroxypolyacid. The resultant polyurethane is extruded in a form of a catheter. The catheter is coated with a hydrophilic polymer, such as described in U.S. Pat. No. 5,563,233, in which the reaction mixture is modified to include an alkyl ester of a dimethylolalkanoic acid or dihydroxypolyacid. A diamine can be used for crosslinking the hydrophilic coating to the hydrophobic catheter, by immersing the coated catheter into a solution of the diamine for about one second to about five minutes to absorb the diamine followed by heating at an elevated temperature to drive off the solvent and bond the polyurethanes. Alternatively, the hydrophilic polyurethane can be coated onto a polypropylene cloth, topcoated with a hydrophobic polyurethane and then both polymers can be crosslinked with a diamine and bonded securely to the polypropylene cloth by reacting the polymers. The polymers would be bonded to each other and would also form interpenetrating networks incorporating the substrate.

The amine can be mixed with the polyurethane intermediate alone and as a concentrate in a filler such as silica, barytes, carbon black and the like and the mixture can be molded, extruded and processed in mixing equipment to obtain a functionalized and crosslinked product. It has been discovered that the polyurethane intermediate can be bonded to a variety of substrates by crosslinking the polyurethane to the substrate using a polyamine. Suitable substrates include plastics, elastomers, metal, brass, steel, aluminum, synthetic and natural rubber, silicon, silicone polymers, polymers of ethylene, propylene and butene such as polyolefins, polyethylene and polypropylene, polystyrene, polyurethane, polyamide, polyester, epoxy, polyimide and polycarbonate. Silicone comprising fillers and substrates can be covalently bonded to polyurethane intermediates by treating the fillers and substrates with an amino organosilane coupling agent. The reinforced fillers will covalently bond to the polymer at the pendant ester sites and thereby serve to reinforce and strengthen the polymer. The polyurethane intermediate can be bonded to silicon comprising substrates such as silicon, glass, silica, alumina and fiber optic tubing using amino organosilane coupling agents. The coated substrates and fillers can be used in medical devices, cosmetics and industrial products. The polymers can be used in low temperature adhesives and curing agents. For example, the polymer can be mixed at room temperature with primary, secondary and tertiary amines and epoxy resins to obtain improved flexibility of the epoxy resin and improved strength of the polyurethane. Further the polymers can be functionalized with the amine and then mixed with epoxy resins, so that the amine acts as a catalyst for the epoxy cure and also to bond the polymer to the epoxy resin. Also, functionalized polymers (FP) can be bonded to pressure sensitive and acrylic adhesives comprising acrylic and methacrylic acid since the pendant amine group of the FP will react with the acid group of the adhesive.

The resultant polyurethane that is functionalized can be reacted with pharmaceutically active agents (PAA). Suitable agents include immuno-suppressant drugs (to reduce the risk of prosthesis rejection and to combat such rejection reaction); anti-bacterial agents, such as antibiotics (to reduce the risk of infection and to combat infection introduced during the operation to implant the prosthesis), anti-viral agents, growth factor regulators and anti-coagulant, anti-thrombogenic or thrombolytic drugs (to reduce the risk and to combat thrombosis and emboli formation). Mention may be made of heparin, heparin fragments, tissue-type plasminogen activator (tPA), urokinase (uPA), anti-thrombosis agents (such as Hirudan) and albumin, as examples of suitable anti-coagulant agents to combat thrombosis. Also suitable are anti-coagulant agents which are antibodies (for example antibodies directed against platelet receptor GPIB and/or GPIB, against platelet receptor GPIIb/IIIa, and/or against von Willebrand Factor (vWF)) and also such agents with vasoactive properties (such as Prostacyclin and nitric oxide). With regard to pharmaceutically active agents which act as growth factor regulators particular mention may be made of antibodies, such as antibodies directed against platelet derived growth factor (PDGF), fibroblastic growth factor (FGF), transforming growth factor beta (TGF), insulin-like growth factor (IGF), interleukins (IL1-8), Endothelin, Thrombin and/or endothelial adhesion molecules, e.g. ICAM-1. Also suitable are angiotensin converting enzyme (ACE) inhibitors (for example Captopril) and endothelial cell growth factor (ECGF). In certain aspects use of anti-sense oligonucleotides or antibodies to particular mRNAs may be advantageous, for examples anti-sense oligonucleotides to a-myc, PCNA and the like or antibodies to the mRNA molecules encoding for growth factors.

Suitable antibiotics which may advantageously be present in the polymer of the invention include Penicillins, Cephalosporins, Aminoglycosides, Tetracyclines, Macrolides, Glycopeptides e.g. Vancomycin, Teicoplanin, Sulphonamides and/or Anti-fungals. More than one pharmaceutically active agent may be bound to the polymer.

The pharmaceutically active agent, enzyme, polymer stabilizer, and cosmetic ingredient may be physically entrapped within the cross-linked polymer and covalently bonded to the functionalized polymer and released at a controlled rate over a predetermined period, for example within one week. The degree of entrapment depends upon molecular weight, chain length, water solubility, molecular configuration of PAA and desired degree of bonding of the PAA to polymer. A portion of entrapped PAA can remain captured within the hydrated polymer and can be released over a period of at least five days, preferably at least one week, more preferably at least one month, still more preferably at least two months, and most preferably at least six months, depending upon the specific objectives of the treatment.

In an alternate embodiment of the invention, Teflon, Dacron, polypropylene, polyamide, polyester cloth or the medical device can be treated by corona and plasma discharges, surface flame, photoinitiation, high energy radiation, ozone and chlorination, coated with a polymer of this invention and the polymer can be crosslinked with a polyamine. Then the treated and coated device can be dipped into a solution of the pharmaceutically active agent (PAA). Alternatively, the polymer can be functionalized after exposing the coated cloth to the high energy treatment and then the treated and functionalized coating can be dipped into an aqueous solution of PAA in order to covalently bond the PAA to the polymer and also crosslink the polymer.

The functionalized polymer will bond more securely to the substrate due to the formation of (interpenetrating networks) IPNs around the substrate after reaction with an amine. Also, the pendant ester of the polyurethane intermediate can react with amine groups and the amine group of the FP can react with active hydrogen groups on the substrate. The type of solvent used can be selected to be compatible with the selected PAA. For example, a preferred solvent for some antithrombogenic agents, such as heparin and tPA, and the like is water. Other representative solvents for some PAAs can be ethyl acetate, ethyl lactate, ethanol, dimethylacetamide, methyl ethyl ketone, dimethylformamide and the like.

The reaction between the functionalized polymer and PAA can proceed at about room temperature to about 100° C., because of the high reactivity of the carboxyl groups on the PAA and the mobility and activity of the amine group attached to the polymer. Preferably for some PAAs the reaction temperature can be reduced to less than about 80° C., more preferably to less than about 60° C. and most preferably to less than about 40° C.

Bonded and nonbonded PAA remain in the polymer hydrogel. It has been found that by controlling the residence time of the treated and coated cloth in the solution of PAA, it is possible to control the amount of drug absorbed in the polymer and/or substrate and consequently the amount of drug that is not bonded to the polymer and/or substrate.

The treated and coated device can be washed in order to remove nonreacted amine prior to immersion in the solution of PAA, if desired. The PAA can be eluteced from the substrate into the patient slowly within a few months. It has also been found that polyurethane intermediates comprising about 5% to about 20% of the ester of a dihydroxy alkanoic acid or dihydroxypolyacid having water absorptivities of about 50% to about 95% can bond about 50% to about 900% more PAA than polymers having water absorptivities of about 0.01% to about 50% due the ability of the high absorptive polymers to absorb more water than the low water absorptive polymers. The PAA can be bonded to the interior of the coating as well as to the coating surface.

Sorting devices and other medical devices can be treated with an amino organosilane coupling agent to form free amino groups at the surface of the silicon and glass materials and then exposed to solutions of the polyurethane intermediate. The amine group on the substrate can react with the pendant ester and provide a hydrophilic surface to the substrate. Included in these substrates are silicon and glass sorting chips and fiber optic catheters and tubing.

Alternatively, the amine-functionalized polyurethane intermediate can be reacted with an unsaturated acid and phenol such as bis-phenol dimethacrylate, acrylic, methacrylic maleic and itaconic acid and then covalently bonded to vinyl and diene polymers using free radical type catalysts such as peroxides and photopolymerization. Altlernatively, the acid comprising polyurethane intermediate can be functionalized with glycidyl methacrylate and glycidyl acrylate and then covalently bonded to vinyl and diene polymers using free radical catalysis. Examples of such polymers are polymers of alpha-olefins such as ethylene, propylene, butene-1, acrylonitrile, stryrene, vinyl monomers such as acrylonitrile, methacrylamide, butyl acrylate, ethyl acrylate, butyl methacrylate, iso-butyl methacrylate, methyl acrylate, methyl methacrylate, and dienes such as butadiene and isoprene.

Alternatively, the polyurethane intermediate comprising alkyl ester of the dihydroxypolyacid or dimethylolpropionic acid can be reacted with a vinyl amine to produce a pendant double bond.

The following examples will serve to further typify the nature of this invention but should not be construed as a limitation of the scope thereof

EXAMPLE 1

A polyether polyurethane can be prepared by mixing 2.1 equivalents of tetramethylxylylene diisocyanate (TMXDI) with 1.0 equivalents of 1,6-hexanediolcarbonate glycol with a molecular weight of 2000. The temperature can be allowed to rise to about 110° C. and 0.001% of dioctyl tin (based on total weight) can be added. After three hours of agitation and reaction, the prepolymer is reacted with one equivalent of the methyl ester of tartaric acid, poured into polypropylene trays and heated at 110° C for about five hours.

The polymer was cooled to ambient room temperature and cut into small pieces. The resultant polymer can be functionalized with an amine and crosslinked with a mono and polyamine for use in catheters, medical devices, coatings and industrial products. The granules were mixed at a concentration of 3% in a solution of 95/5 ethanol/water. One equivalent of 98% pure 1,6-hexane diamine per equivalent of ester was added to the solution. Teflon cloth was dipped into the solution for about five seconds. The cloth was heated for 15 minutes at 110° C. to crosslink the polymer. The cloth was immersed in water for ten minutes to remove unreacted hexane diamine. The polymer can be used t o coat sewing rings of mechanical synthetic and animal heart valves and to extend the elution rate of pharmaceutically active agents.

EXAMPLE 2

A polyether polyurethane can be prepared by mixing 2.1 equivalents of tetramethylxylylene duisocyanate (TMXDI) with 1.0 equivalents of 1,6-hexanediolcarbonate glycol with a molecular weight of 2000. The temperature can be allowed to rise to about 110° C. and 0.001% of dioetyl tin (based on total weight) can be added. After three hours of agitation and reaction, the prepolymer is reacted with half equivalent of methyl ester of tartaric acid and half equivalent of neopentyl glycol, poured into polypropylene trays and heated at 110° C. for about five hours.

The polymer was cooled to ambient room temperature and cut into small pieces. The resultant polymer can be functionalized with an amine and crosslinked with a polyamine for use in catheters, medical devices, coatings and industrial products. The granules were mixed at a concentration of 3% in a solution of 95/5 ethanol/water. One equivalent of hexane diamine per equivalent of ester was added to the solution. Teflon cloth was dipped into the solution for about five seconds. The cloth was heated for 15 minutes at 110° C. to crosslink the polymer. The cloth was immersed in water for ten minutes to remove unreacted hexane diamine. The polymer can be used to coat sewing rings of mechanical synthetic and animal heart valves and to extend the elution rate of pharmaceutically active agents.

EXAMPLE 3

Polyoxyethylene diol having a number average molecular weight of 8463 was heated under vacuum to 0.028% of water, and 404 parts of the dried diol was added to 4.5 parts of dibutylester tartrate, 4.5 parts of ethylene glycol, and 0.34 part of water. The mixture was heated with stirring until a homogeneous melt was obtained. Then, 41 parts of methylene bis-cyclohexyl-4-4'-diisocyanate were added. The NCO/OH ratio was 0.94. When the temperature reached about 80° C., 2.8 ml of dibutyl tin dilaurate was added, and the mass was allowed to exotherm. The mass was heated at 100° C for 1.5 hours and postcured three hours at 60° C to complete formation of the polymer. The polymer was dissolved in 95/5 ethanol/water to produce a clear solution. The solution was mixed with one equivalent of hexane diamine, placed in a pan to evaporate the solvent and heated at 110° C. The polymer was mixed with tetrahydrofuran and did not dissolve.

The polymer can be functionalized and crosslinked with a polyamine for use in medical devices, coatings of rubber products and cosmetics.

EXAMPLE 4

Polyoxyethylene diol having a number average molecular weight of 1450 and diethylene glycol were analyzed for water, and determined to have 0.11% and 0.02% respectively. To 233 parts of the diol was added 38 parts of diethylene glycol, and 18 parts of dibutyl tartrate. The mixture was heated with stirring until a homogeneous melt was obtained. Then, 0.8 parts of water and 163 parts of methylene bis-cyclohexyl--4-4'-diisocyanate were added. NCO/OH ratio was 0.95. When the temperature reached about 80° C., 0.7 ml of stannous octoate was added, and the mass was allowed to exotherm. The mass was heated at 100° C. for one hour to complete formation of the polymer. The granules were dissolved in a solution of 95/5 ethanol/water at a concentration of 3% and can be crosslinked with about one equivalent of diamine per equivalent of ester and was functionalized with four equivalents of 1,6-hexane diamine for use in medical devices, including but not limited to catheters, coatings of guidewires, sensors, burns and wound dressings. The polymer was washed several times to remove unreacted diamine.

EXAMPLE 5

To 366 parts of polyoxyethylene diol having a number average molecular weight of about 8000 was added II parts of diethylene glycol, 17 parts of dibutyl tartrate and 0.82 part of water. The mixture was heated with stirring until a homogeneous melt was obtained. Then, 59 parts of methylene bis-cyclohexyl-4-4'-diisocyanate were added. NCO/OH ratio was 0.85. When the temperature reached about 70° C., 0.7 ml of dibutyl tin dilaurate was added, and the mass was allowed to exotherm. The mass was heated at 100° C. for about one hour to complete formation of the polymer.

The polymer was dissolved in a solution of 95/5 ethanol/water and crosslinked with one equivalent of 1,6-hexanediamine and functionalized with about four equivalents of the diamine per equivalent of ester group. The functionalized polymer was not soluble in tetrahydrofuran, indicating that the polymer was cross-linked.

The polymer was dissolved in a solution of 95/5 ethanol/water and ⅓ equivalent of 1,6-hexane diamine and then a film was cast from the solution. The film was heated one hour at 100° C. to crosslink the polymer. The film had a water absorption of 91% and a linear expansion of 134%. The polymer was crosslinked in a similar manner with one-half and one equivalent of 1,6-hexane diamine. The corresponding water absorption values were 90% and 91% and the corresponding linear expansion values were were 121% and 122%, indicating that a highly water absorptive polymer had been formed. The crosslinked hydrated films were tough and rubbery and had cohesion whereas non-crosslinked polymers possess little cohesion after 24 hours in water.

The functionalized polymer was washed several times with water to remove excess diamine and dried. The polymer was dissolved in 95/5ethanol /water. About one and four equivalents of citric acid was added to separate solutions of the functionalized polymer. The polymer with one equivalent of citric acid was insoluble in ethanol/water and the polymer mixed with four equivalents of citric acid was soluble, indicating that it was not cross-linked. The pH of the functionalized polymer was less than 5.5, and that of the polymer prior to the citric acid addition was greater than 8.0.

The granules were mixed in a solution of 95/5 ethanol/water and one equivalent of hexane diamine per equivalent of ester group at a concentration of 3%. Teflon cloth can be dipped into the solution for about five seconds. The polymer can be used to coat sewing rings of mechanical synthetic and animal heart valves and to extend the elution rate of pharmaceutically active agents. The polymer can be used to coat over hydrophobic and amphiphilic polymers.

The polymer was dissolved in water, placed in a vacuum oven at 25 inches of mercury vacuum to remove oxygen, and then mixed with hexane diamine. The solution was mixed on roller mill for about four hours. The jar was opened a few times and the odor of butanol was detected, indicating that the reaction had occurred. The solution turned slightly yellow and a strong odor of butanol was noted after the jar was opened after more than 48 hours of mixing on the roller mill. A comparable solution made without removal of the oxygen had a strong yellow color.

The polymer was dissolved in 95/5 ethanol/water and bonded to glass which had been treated with an amino organosilane coupling agent such as silane A1100 made by Union Carbide corporation. The silane groups bond to the glass and the amine groups react with the pendant ester groups of the polymer to form a covalently high slip, high water absorptive and biocompatible coating on the glass for use in medical devices such as sorting devices and fiber optic tubing.

EXAMPLE 6

Polyoxyethylene diol having a number average molecular weight of 1450 and diethylene glycol were analyzed for water, 0.11% and 0.02% respectively. To 224 parts of the diol was added 17 parts of diethylene glycol, and 60 parts of dibutyl tartrate. The mixture was heated with stirring until a homogeneous melt was obtained. Then, 0.81 part of water and 152 parts of methylene bis-cyclohexyl-4-4'-diisocyanate were added. NCO/OH ratio was 0.95. When the temperature reached about 82° C., 0.7 ml of stannous octoate was added, and the mass was allowed to exotherm. The mass was heated at 100° C. for one hour to complete formation of the polymer. The granules were dissolved in a solution of 95/5 ethanol/water at a concentration of 3%, can be crosslinked with about one equivalent of diamine per equivalent of ester and were functionalized with four equivalents of 1,6-hexane diamine for use in medical devices, including but not limited to catheters, coatings of guidewires, sensors, burns and wound dressings. The polymer was washed several times to remove unreacted diamine.

EXAMPLE 7

Polyoxyethylene diol having a number average molecular weight of 1450 and diethylene glycol w ere analyzed for water, 0.11% and 0.02% respectively. To 236 parts of the diol was added 39 parts of diethylene glycol, and 12 parts of dimethyl tartrate. The mixture was heated with stirring until a homogeneous melt was obtained. Then, 0.7 part of water and 165 parts of methylene bis-cyclohexyl-4-4'-diisocyanate were added. NCO/OH ratio was 0.95. When the temperature reached about 82° C., 0.7 ml of stannous octoate was added, and the mass was allowed to exotherm. The mass was heated at 100° C. for one hour to complete format ion of the polymer. The granules were dissolved in a solution of 95/5 ethanol/water at a concentration of 3% and can be crosslinked with about one equivalent of diamine per equivalent of ester and were functionalized with four equivalents of 1,6-hexane diamine for use in medical devices, including but not limited to catheters, coatings of guidewires, sensors, burns and wound dressings. The polymer was washed several times to remove unreacted diamine.

The granules were dissolved in a solution of 95/5 ethanol/water at a concentration of 25%, purged of dissolved oxygen by bubbling nitrogen through the solution. To the solution was added hexane diamine. The solvent can be removed b y gently blowing nitrogen through the solution in a vacuum oven. Then the mixture can be heated under vacuum at about 100° C. to form a slightly yellowish-colored polymer comprising pendant amide groups.

The polymer was dissolved in 95/5 ethanol/water and bonded to glass which had been treated with an amino organosilane coupling agent such as silane A1100 made by Union Carbide Corporation. The silane groups bond to the glass and the amine groups react with the pendant ester groups of the polymer to form a covalently high slip, high water absorptive and biocompatible coating on the glass for use in medical devices such as sorting devices and fiber optic tubing.

EXAMPLE 8

To 217 parts of polyoxyethylene diol having a number average molecular weight of 1450 can be added 37 parts of diethylene glycol, 1.05 part of water and 25 parts of the butyl ester of dimethylolpropionate. The mixture was heated with stirring until a homogeneous melt is obtained. Then, 174 parts of methylene bis-cyclohexyl-4-4'-diisocyanate can be added. NCO/OH ratio was 0.95. When the temperature reaches about 82° C., 0.7 ml of stannous octoate is added, and the mass is allowed to exotherm. The mass is heated at 100° C. for one hour to complete formation of the polymer. The granules can be dissolved in a solution of 95/5 ethanol/water at a concentration of 3%, can be crosslinked with about one equivalent of diamine per equivalent of ester and functionalized with four equivalents of 1,6-hexane diamine for use in medical devices, including but not limited to catheters, coatings of guidewires, sensors, burns and wound dressings. The polymer is washed several times to remove unreacted diamine.

EXAMPLE 9

151 grams of polyoxytetramethylene diol having a number average molecular weight of about 1000 and 62 grams of the butyl ester of dimethylolpropionate can be added to 0.03 gram of dibutyl tin dilaurate. The materials can be mixed with 22 grams of dicyclohexyl methane diisocyanate and cured at 110° C. for three hours.

The resultant polymer can be functionalized with about five parts of ethylene diamine for use in obtaining covalently bound antioxidants and ultraviolet stabilizers.

EXAMPLE 10

A blend of polyoxytetramethylene diol having a number average molecular weight of about 1250 and dibutyl tartrate can be mixed and degassed at 35° C. The ratio is 65.2 grams of the diol and 25.8 of the ester. After degassing, 0.015 gram of dibutyl tin dilaurate can be added and 27.5 grams of dicyclohexyl methane diisocyanate can be added and mixed with the diol, ester and catalyst. The mixture is cured at 110IC for four hours to obtain a polymer that can be crosslinked and functionalized with amines for use in medical devices, industrial products and cosmetics.

EXAMPLE 11

26 grams of dicyclohexyl methane diisocyanate can be added to a resin flask. The flask is purged with nitrogen and 73.96 grams of dried polyoxytetramethylene diol having a number average molecular weight of about 1250 is added slowly to the flask. After the diol has been added, 0.015 gram of dibutyl tin dilaurate can be added. The mixture is held at 80° C. for four hours until a theoretical NCO content of about 4.1 is reached. After cooling to room temperature, 12.5 grams of dibutyl tartrate is added to the prepolymer and deaerated. The mixture is heated for eight hours at 110° C. to obtain a polymer that can be functionalized with an amine and functionalized and crosslinked with a polyamine for use in medical devices, industrial products and cosmetics.

EXAMPLE 12

2.1 equivalents of tetramethylxylylene diisocyanate and 2.1 equivalents of 1,6-hexanediol carbonate glycol having a number average molecular weight of about 2000 can be added to a four-liter resin flask under a blanket of nitrogen. The temperature can be increased to about 110° C. and 0.001% of dioctyl tin dilaurate is added. The mixture is allowed to react for three hours to form an isocyanate terminated prepolymer. The prepolymer can be reacted with 1.0 equivalent of the butyl ester of dimethylolpropionate. The reaction is carried out at 100° C. for five hours.

The resultant polycarbonate polyurethane can be functionalized and crosslinked with a polyamine for use in medical devices, industrial products and cosmetics.

EXAMPLE 13

The procedure followed in Example 12 can be repeated using 2.1 equivalents of 4,4-dicycylohexylmethane diisocyanate. The resultant polycarbonate polyurethane can be functionalized and crosslinked with a polyamine for use in medical devices, industrial products and cosmetics.

EXAMPLE 14

The procedure followed in Example 12 can be repeated using 1 equivalent of butyl tartrate. The resultant polycarbonate polyurethane can be functionalized and crosslinked with a polyamine for use in medical devices, industrial products and cosmetics.

It is to be understood that the above-described embodiments are illustrative of only a few of the many possible specific embodiments which can represent applications of the principles of the invention. Numerous and varied other arrangements can be readily devised in accordance with these principles by those skilled in the art without departing from the spirit and scope of the invention.

We claim:

1. A polyurethane comprising the reaction product of a poyurethane intermediate comprising an alkyl ester of dimethylolalkanoic acid or dihydroxypolyacid;
   a polyoxyalkylene diol; and
   an organic diisocyanate; and
   a solution of an amine equivalent and a solvent having less than about 50% by weight of water, said amine equivalent including one or more amine groups wherein said polyurethane comprises an amide.

2. The polyurethane of claim 1 wherein said amine equivalent is employed in an amount of about equal to or about less than an equivalent amount by weight of amine to ester to crosslink said polyurethane.

3. The polyurethane of claim 1 wherein said amine equivalent is employed in an amount of about one to about two times the equivalent amount by weight of amine to ester to functionalize and crosslink said polyurethane.

4. The polyurethane of claim 1 wherein said amine equivalent is employed in an amount of about two to about ten times the equivalent amount by weight of amine to ester to functionalize said polyurethane.

5. The polyurethane of claim 1 wherein said alkyl ester of dimethylolalkanoic acid or dihydroxypolyacid is present in an amount of about 0.01% to about 30% by weight of the reaction mixture.

6. The polyurethane of claim 5 wherein said alkyl ester is present in an amount of about 0.10% to about 8% by weight of the reaction mixture.

7. The polyurethane of claim 4 wherein said alkyl ester of dimethylolalkanoic acid or dihydroxypolyacid is selected from the group consisting of dihydroxy benzoic acid ester, glyceric acid ester, straight chain and branched alkyl esters of tartaric acid and trihydroxy n-butyric acid containing carbon lengths of 1–20 or butyl, propyl, ethyl, hexyl, octyl, decyl, methyl, nonyl, stearyl, and dodecyl 2,2-di (hydroxymethyl)propionic acid and trihydroxy n-butyric acid ester.

8. The polyurethane of claim 1 wherein the reaction product of said polyurethane intermediate further comprises an alkylene glycol selected from ethylene glycol, 2,-4-pentane diol, 2-methyl-1,3 propanediol, propylene glycol, 1-4-butane diol, neopentyl glycol, dipropylene glycol, triethylene glycol, tripropylene glycol, diethylene glycol, hexane diol, 2,-4-pentane diol, cyclohexanediol, cyclohexanedimethanol, 2,2-dimethylolpropionic acid and 2-ethyl-1,3-hexane.

9. The polyurethane of claim 1 wherein the reaction product of said polyurethane intermediate further comprises:
   water in an amount of about 0.001% to about 0.80% by weight of the reaction mixture in an equivalent molecular weight ratio of NCO/OH of the diol, the alkyl glycol and the water of about 0.4 to about 1.2.

10. The polyurethane of claim 1 wherein said polyoxyalkylene diol is selected from the group consisting of polyoxyethylene diol having a number average molecular weight of about 100 to about 20,000, polyoxypropylene diol having a number average molecular weight of about 200 to about 4,000, polydimethylsiloxane polyoxyalkylene copolymer having a number average molecular weight of about 400 to about 3000, polyoxytetramethylene diol having a number average molecular weight of about 400 to about 3,000, polybutylene oxide having a number average molecular weight of about 1000 to about 4000 and polyether polycarbonate diol having an average molecular number weight of about 400 to about 3,000;
   and wherein said reaction product of said polyurethane intermediate further comprises water in an amount of about 0.02% to about 0.45% by weight of the reaction mixture and an equivalent mole weight ratio of NCO to OH of about the diol and water 0.80 to about 0.99 and wherein said polyurethane intermediate is substantially amphiphilic.

11. The polyurethane of claim 1 wherein said polyoxyalkylene diol comprises:
   a hydrophilic diol of polyoxyethylene diol having a number average molecular weight from about 400 to about 10,000 at about 10% to about 95% by weight of the reaction mixture mixed with a portion of hydrophobic polyoxyalkylene diol of about 15% to about 30% by weight of the reaction mixture, said hydrophobic polyoxyalkylene diol selected from polyoxytetramethylene diol having a number average molecular weight of from about 200 to about 4,000, polyoxypropylene diol having a number average molecular weight of from about 400 to about 4,000, polyether polycarbonate diol having a number average molecular weight of about 1,000 to about 2,000, polybutylene oxide having a number average molecular weight of about 1000 to about 4000, and polydimethylsiloxane polyoxyalkylene copolymer having a number average molecular weight of about 500 to about 3,000 wherein the polyoxyalkylene is selected from polyoxyethylene and polyoxypropylene; an alkylene glycol selected from ethylene glycol, propylene glycol, 2-ethyl-1,3-hexane diol, tripropylene glycol, 1,4-butane diol, neopentyl glycol, triethylene glycol, 2,-4-pentane diol, 2-methyl-1,3 propanediol, hexane diol, cyclohexanediol, cyclohexanedimethanol, dipropylene glycol, 2,2-dimethylolpropionic acid and diethylene glycol;
   and wherein said reaction product of the polyurethane intermediate further comprises water in an amount of about 0.05% to about 0.70% by weight of the reaction mixture in an equivalent mole weight ratio of NCO to OH of the diol, alkylene glycol and water of about 0.90 to about 1.0.

12. The polyurethane of claim 11 wherein said ester acid is the alkyl ester of dimethylolpropionic acid in an amount of from about 0.02% to about 25% by weight of the reaction mixture.

13. The polyurethane of claim 1 wherein said polyoxyalkylene diol comprises at least about 60% by weight of the reaction mixture of polyoxyethylene diol having a number aerage molecular weight of about 200 to about 20,000 wherein said polyurethane intermediate is substantially hydrophilic.

14. The polyurethane of claim 10 wherein said ester acid is the alkyl ester of 2,2-dimethylolpropionic acid in an amount of from about 0.3% to about 5% by weight of the reaction mixture.

15. The polyurethane of claim 1 wherein said polyoxyalkylene diol comprises:
   about 5% to about 80% by weight of a hydrophobic diol selected from the group consisting of a polyoxypropylene diol and polyoxytetramethylene diol having a number average molecular weight from about 200 to about 6,000, polybutylene oxide having a number average molecular weight of about 1000 to about 4000, polydimethylsiloxane polyoxyethylene copolymer having a number average molecular weight of about 500 to about 3,000 and polyetherpolycarbonate diol and having a number average molecular weight of about 1000 to about 4000; and
   about 1% to about 40% by weight of a hydrophilic diol of polyoxyethylene;

and wherein said reaction product of said polyurethane intermediate further comprises water in an amount of about 0.01% to about 0.70% by weight of the reaction mixture in an equivalent mole weight ratio of NCO to OH of the hydroxyl groups of the diols alkylene glycol and water from about 0.7 to about 1.2.

16. The polyurethane of claim 15 wherein said hydrophobic diol is polyether polycarbonate diol in an amount of about 5% to about 70% by weight and polydimethylsiloxane polyoxyethylene copolymer in an amount of about 5% to about 50% by weight of the reaction mixture.

17. The polyurethane of claim 1 wherein said amine is selected from the group consisting of ethylene diamine, butyl diamine, butyl amine, propanediamine, butanediamine, pentane diamine, propyl amine, pentylamine, ethylene amine, heptyl amine, triethylene tetraamine, diethylenetriamine, hexylamine, hexanediamine, octanediamine, nonanediamine, decyldiamine, diaminotoluene, phenylenediamine, benzidazole, benzothiazoles, toluene, xylylenediamine, 1,4-diaminocyclohexane, 2-methylpentamethylene diamine, benzene diamine, glycine, diglycolamine, ethanolamine, fatty amine and polyoxyalkylene amines and diamines.

18. The polyurethane of claim 1 wherein an alkylene glycol is added to said alkyl ester of dimethylolalkanoic acid or dihydroxypolyacid said alkylene glycol being selected from the group of ethylene glycol, 2,-4-pentane diol, 2-methyl-1,3 propanediol, propylene glycol, dipropylene glycol, 1,4-butane diol, neopentyl glycol, triethylene glycol, tripropylene glycol, diethylene glycol, hexane diol, cyclohexanediol, cyclohexanedimethanol, 2,2-dimethylolpropionic acid and 2-ethyl-1,3-hexane diol, and mixtures thereof.

19. The polyurethane of claim 1 wherein said amine equivalent is a monoamine and is employed in an amount of about 0.2 to about 1.2 the equivalent amount by weight of amine to functionalize said polyurethane.

20. The polyurethane of claim 19 wherein said amine equivalent is vinylamine.

21. The polyurethane of claim 1 further comprising a catalyst selected from the group of Lewis acid, phosphoric acid, sulfuric acid, stannous octoate, dibutyl tin dilaurate, acetic anhydride, acetic acid chloride, phosphorus pentoxide, zinc chloride, tetrabutyl titanate, unblocked and amine-blocked alkane sulfonic and aromatic sulfonic acid.

22. The polyurethane of claim 1 wherein said solvent is selected from the group consisting of ethanol, methyl ethyl ketone, pyrrolidone, dimethylacetamide, dimethylformamide, isopropanol, methanol and butanol.

23. A polyurethane comprising the reaction product of a polyurethane intermediate comprising of dimethylolalkanoic acid;

a polyoxyalkylene diol;

an organic diisocyanate; and an amine equivalent, said amine equivalent including one or more amine groups said polyurethane intermediate being crosslinked with an epoxy containing material selected from bisphenol-epichorohydrin, cycloaliphatic epoxy resins, epoxidized fatty acids, glycidyl methacryalate, glycidyl acrylate with a catalyst selected from a Lewis acid, tetrabutyl titanate, amine-blocked and unblocked alkane, aromatic sulfonic acid, benzyldimethyl amine, benzyldimethyl ammonium chloride, dimethylcyclohexylatnine, triethylenediamine, triethylenetetramine and triphenylphosphine wherein said polyurethane comprises an amide.

24. The polyurethane of claim 1 wherein the alkyl ester is butyl, ethyl, methyl or propyl dimethylolpriopionic acid.

25. An article of manufacture formed from the polyurethane of claim 1.

26. The article of manufacture of claim 25 wherein said article is a coating.

27. The article of manufacture of claim 25 wherein said article is a film.

28. The article of manufacture of claim 25 wherein said article is a medical device selected from the group consisting of an infusion therapy catheter, midline catheter, intravenous catheters, synthetic heart valve, synthetic vein, artery, scar flattener, cardiovascular therapy catheter, stent, port, dilator, and dialysis catheter.

29. An article of manufacture formed from the polyurethane of claim 3.

30. The article of manufacture of claim 29 further comprising a compound selected from the group consisting of phenol, isocyanate, carboxylic acid, mercaptan, silanol and epoxy.

31. The article of manufacture of claim 29 further comprising an active agent selected from the group consisting of pharmacologically active agent, antithrombogenic agent, anticancer agent, cellular growth agent and anticoagulent agent.

32. An article of manufacture of claim 1 further comprising a second polyurethane comprising a second polyurethane intermediate comprising the reaction product of an alkyl ester of dimethylolalkanoic acid or dihydroxypolyacid, a second polyoxyalkylene diol and a second organic diisocyanate.

33. The polyurethane of claim 1 further comprising a vinyl monomer selected from an alkyl ester of acrylic, methacrylic, maleic or itaconic acid, wherein said amine equivalent is present in an amount of about 0.2 to about 1.0 equivalent amount by weight of amine to ester to bond said vinyl monomer to said polyurethane intermediate.

34. A polyurethane comprising the reaction product of a poyurethane intermediate comprising an alkyl ester of dimethylolalkanoic acid or dihydroxypolyacid;

a polyoxyalkylene diol;

an organic diisocyanate; and an amine equivalent, said amine equivalent including one or more amine groups wherein said polyurethane comprises an amide.

35. The polyurethane of claim 1 wherein the reaction of the alkyl ester of dihydroxypolyacid and said amine equivalent is performed under substantially oxygen- free conditions.

36. An article of manufacture formed of the polymer of claim 34.

37. The article of manufacture of claim 36 comprising a molded article.

38. The article of manufacture of claim 37 wherein said article is formed by extrusion.

* * * * *